United States Patent [19]

Cooke et al.

[11] Patent Number: 5,047,437
[45] Date of Patent: Sep. 10, 1991

[54] POROUS POLYACRYLONITRILE BEADS AND PROCESS FOR THEIR PRODUCTION

[75] Inventors: Michael T. Cooke, New York, N.Y.; Laura J. Hiscock, Norwalk, Conn.

[73] Assignee: American Cyanamid

[21] Appl. No.: 275,317

[22] Filed: Nov. 23, 1988

[51] Int. Cl.$^5$ ............................................. C08J 9/28
[52] U.S. Cl. ...................................... 521/56; 521/60; 521/64; 521/84.1; 521/89; 521/142; 530/413
[58] Field of Search .................... 521/84.1, 89, 64, 60, 521/142, 144, 143, 147, 149, 63, 56; 530/413

[56] References Cited

U.S. PATENT DOCUMENTS

| 3,938,001 | 9/1976 | Coupek et al. | 435/213 |
| 4,094,848 | 6/1978 | Naito | 521/149 |
| 4,110,529 | 8/1978 | Stoy | 528/491 |
| 4,247,498 | 1/1981 | Castro | 264/41 |
| 4,486,549 | 12/1984 | Matsumoto et al. | 435/180 |
| 4,519,909 | 5/1985 | Castro | 521/64 |
| 4,594,207 | 6/1986 | Josefiak et al. | 521/63 |
| 4,666,607 | 5/1987 | Josefiak et al. | 425/67 |

Primary Examiner—Veronica P. Hoke
Attorney, Agent, or Firm—Steven Flynn

[57] ABSTRACT

Isotropic porous polymer beads having a high surface porosity and large pore diameters from about 0.002 to about 5 microns are produced from solutions of an acrylonitrile polymer or a copolymer by a thermally-induced phase separation process. The use of mixed solvent-non-solvent combinations as solvents for the polymers, produces high pore content, substantially spherical beads having a morphology ideally suited to the chromatography of large molecules, such as proteins, and for enzyme-binding.

27 Claims, 4 Drawing Sheets

POROUS POLYACRYLONITRILE BEADS AND PROCESS FOR THEIR PRODUCTION

CROSS-REFERENCE TO RELATED APPLICATION

This application is related to a commonly assigned, concurrently filed applications by David Arthur Ley, Laura Jean Hiscock, and Michael Timothy Cooke for Process in the Preparation of Porous Polyacrylonitrile Beads, Ser. No. 07/275.170 and Michael Timothy Cooke and Laura Jean Hiscock, for Porous Polymer Beads and Process, Ser. No. 07/275.256.

This invention relates to isotropic, porous polymer beads of an acrylonitrile having very high surface porosity (substantially skinless), pore diameters ranging from 0.002 to 5 microns and a pore volume of not substantially less than 1.5 ml/g. The beads are made from acrylonitrile polymer solutions by a thermally-induced phase separation process. The morphology of the beads makes them ideally suitable for use in chromatography applications especially in biomolecular separation processes such as protein separations.

BACKGROUND OF THE INVENTION

Phase separation processes of polymer solutions, including those of acrylonitrile, have been very useful for the preparation of porous low-density microcellular plastic foams, primarily in the form of fibers, sheets and blocks or slabs.

In U.K. Patent Specification No. 938,694, a microporous material is made by mixing a finely divided thermoplastic resin with a gel-forming solvent therefore, raising the temperature of the mixture above the gelling point thereof, decreasing the temperature to form a gel and removing the gel forming-solvent from the mixture by treatment with a solvent for the gel-forming solvent but not for the thermoplastic resin. In the example of this U.K. patent, 35 percent by volume of polyethylene resin was heated with 65 percent by volume of xylene at 140° C and allowed to cool to room temperature, whereupon a gelled mass was formed. The mass was cut into sheets and the xylene was extracted with ethanol. After removal of the ethanol with water, microporous foam sheets were obtained, which had a pore size of below about 1.0 micron and a total porosity of about 65 percent, the sheets being useful as separators in a storage battery, for example.

In Young, et al., U.S. Pat. No. 4,430,451, such a process was used to produce low density foams from poly(4-methyl-1-pentene) resin and a solvent comprising bibenzyl and using, for example, methanol, to remove the bibenzyl leaving the resin in the form of a fragile, microcellular, low density foam, having a broadly disclosed pore volume of from 90 to 99 percent, and a specifically exemplified pore volume of about 94 percent. Such foams were machined into blocks for laser fusion targets.

In Castro, U.S. Pat. Nos. 4,247,498 and 4,519,909, the thermally-induced phase separation technology was employed to make microporous foams in forms ranging from films to blocks to intricate shapes. In the '909 Patent, it is stated in Col. 6, lines 34-35, that "as the solution is cooled to the desired shape, no mixing or other shear force is applied while the solution is undergoing the cooling." This strongly suggests that beads were not contemplated. Castro, '909 Patent, Col. 27-28, also discloses microporous polymers containing functional liquids. The polymers are said to have either a cellular or non-cellular structure in which the liquid is incorporated. A cellular structure is defined in Col. 7 as having a series of enclosed cells having substantially spherical shapes with pores or passageways interconnecting adjacent cells, the diameter of said cells being at least twice the diameter of said pores. Such a morphology is not ideal for adsorbing large molecules because the passageways are not of uniform diameter and this represents a serious drawback for large molecule absorption and desportion.

Stoy, U.S. Pat. No. 4,110,529, discloses spherical polyacrylonitrile beads formed by a process in which a polymer solution is dispersed in a "liquid dispersing medium that is a nonsolvent for the polymeric material and is immiscible with the solvent." The emulsion is added "with stirring into an excess of a coagulating liquid that coagulates the polymer material...and that is a non-solvent for the polymer material, is miscible with the solvent, and is immiscible with the dispersing medium." In adopting the classical method to making beads, applicants herein can, for example, form a hot emulsion of a polymer solution in mineral oil and quench the same by adding it to mineral oil at a lower temperature. Therefore, applicants do not use a "coagulating" bath which is immiscible with the polymer solution and miscible with the dispersing medium. The main drawback with the Stoy process, however, is that, even though up to or greater than 95 percent void content is obtained, as set forth in Col. 3, lines 39-41, "a non-sticky skin is formed on the surface of the droplets at the very beginning of the coagulation." Such a skin cannot be controlled by such a process and is only partially permeable, thus substantially interfering with the absorption and desorption of large molecules, and making very desirable the production of non-skinned or controllably skinned microporous beads. Additionally, as will be shown in the comparative examples hereinafter, beads made using the process disclosed in Stoy possess nonisotropic pores, with large pores concentrated in the interior and thus further contributes to their ineffectiveness in size exclusion chromographic applications and the desorption of large molecules.

Matsumoto, in U.S. Pat. No. 4,486,549 generally discloses porous fibers and filaments, but also teaches the formation of polyacrylonitrile particles having a porous structure by adding the polymer solution dropwise into an atomizer cup in Example 1 of the patent. However, beads produced in this method have low pore volume, 0.90 ml/g, as seen in Comparative Example 1A of this application; this is responsible for low capacity. The particles tend to be flattened and non-spherical, as is shown in FIG. 20, and this will cause excessive pressure drops.

Of general interest is Josefiak et al., U.S. Pat. No. 4,594,207, in which the technology is used to produce porous bodies, such as fibers, hollow filaments, tubes, tubing, rods, blocks and powdery bodies from polyolefins, poly (vinyl esters), polyamides, polyurethanes and polycarbonates. Poly (acrylonitriles) were not used. There were adjustments in total pore volume, pore size and pore walls being made by varying solvent ratios; the pore volumes exemplified are in the 75-77.5 percent range. Josefiak discloses shaping the viscous solution by methods requiring no shearing during cooling. Examples 1-5 in the Josefiak patent describe the shaping of hollow filaments by spinning the solution through a hollow filament nozzle and then cooling; and Examples 5–7 describe the forming of membranes by coating a plate glass with the solution and then cooling. It is also noticed in Josefiak, U.S. Pat. No. 4,666,607 Col. 2, line 43 to Col 3, line 14, that he teaches away from using strong shear forces during cooling. At no point in the disclosures does Josefiak contemplate the use of turbulence during cooling, thus strongly suggesting that beads were not contemplated. In contrast, in the present invention, shear is used in the solution prior to and during cooling, so as to form droplets which cool into beads. These beads surprisingly provide a high degree of separation capability in chromatographic applications, low resistance to chromatographic flow rates and excellent morphological advantages for column packing applications, such as having good compressive stength and being substantially spherical. In Zwick, Applied Polymer Symposia, No. 6,109–149, 1967, a similar method was used to prepare microporous fibers using polymer concentrations in the wet-spinning range, 10–25 percent, producing microporous structures having pore volumes of 75–90 percent.

In Coupek et al., U.S. Pat. No. 3,983,001, is described a method of isolating biologically active compounds by affinity chromatography. The compounds isolated included enzymes, coenzymes, enzyme inhibitors, antibodies, antigens, hormones, carbohydrates, lipids, peptides, and proteins as well as nucleotides, nucleic acids, and vitamins, such as Vitamin B. Among the porous carriers are mentioned polyacrylonitrile particles, but these are macroporous, require secondary shaping processes to form particles from the gel obtained by practicing this invention, and are inferior in other chromatographic processes, particularly for size exclusion chromotography.

The current state of the art of microporous beads for purification, chromatography, enzyme binding and the like, are represented by the highly porous hydrophylic resins for sale under the trademark SEPABEADS® by Mitsubishi Chemical Industries Limited. These are said to comprise spherical hard gel beads composed of highly porous hydrophilic vinyl polymer. They have an average diameter of 120 microns and a pore volume of less than 1.6 ml/g. Also to be mentioned, the same company produces DIAION® highly porous polymer beads comprised of styrene crosslinked with divinyl benzene. Such beads can have a narrow pore size distribution, their pore volume is less than 1.2 ml/g.

It is thus apparent from the state of the art set forth above that a major drawback of many microporous polymer structures has been the pore volume being less than desired, typically from 20 to 75 percent of the polymer structure, or up to 90 percent, but, as seen in Castro, mechanical strength difficulties arise. Lower void volume enhances mechanical strength, but produces low capacity when used in structures such as chromatography adsorbants. Other prior art structures are in the shape of fibers, filaments or membranes and cannot be effectively used to pack chromatographic columns, thus requiring costly secondary shaping equipment. Many of the prior art structures are not rigid and may swell with changes in ionic strength or solvent, making column packing and control difficult.

It has now been discovered that microporous beads, substantially spherical in shape, having very high void volume, a substantially skinless surface, large pore diameters and high mechanical strength can be produced in thermal-induced phase separation methods by judicious selection of process techniques. Such beads are novel and their valuable properties are entirely unexpected in view of the prior art and the best materials made commercially available to date. The substantially skinless beads of this invention permit access of large molecules to their inner surface areas. They are made by a process which does not involve difficultly-controllable chemical reactions, such as formation of porous beads from monomers. The morphology of the beads makes them ideally suited for most chromatography applications, especially for the chromatography of proteins. They can also be used for enzyme immobilization, and for many other applications.

DESCRIPTION OF THE DRAWINGS

The invention can be understood by reference to the drawings in which.

SUMMARY OF THE INVENTION

Figure 1:
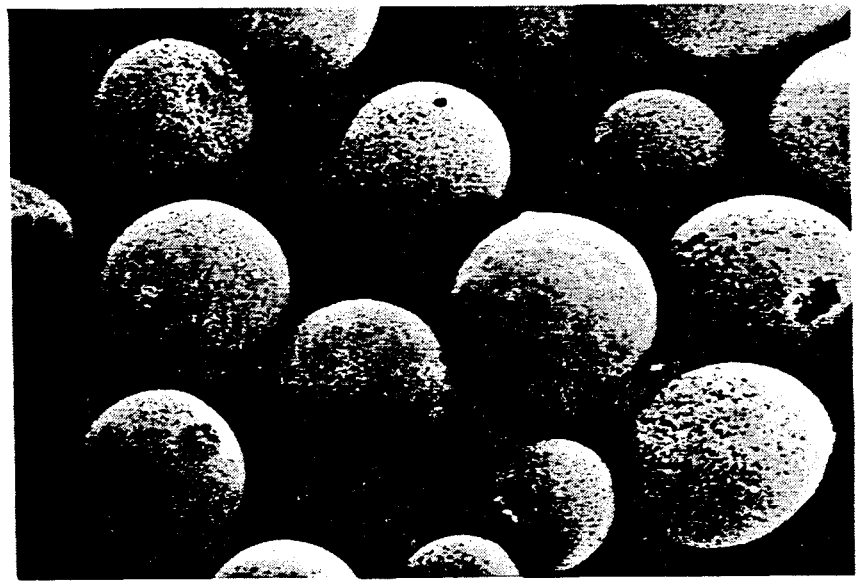
FIG. 1 is a photomicrograph at 500X magnification of microporous spherical poly(acrylonitrile) copolymer beads of this invention, and illustrates a skinless surface.

In accordance with the present invention there are provided substantially skinless highly porous beads comprising a homopolymer or copolymer of an acrylonitrile, said bead being substantially non-swellable in water, and being substantially istropic and having pores of not substantially greater than about 5 microns in diameter and wherein the pore volume is not substantially less than about 1.5 ml/g.

The invention also contemplates such porous polymer beads, the pores being at least partially filled with a high molecular size compound, and the beads being substantially spherical.

In a preferred manner of making the beads, acrylonitrile homopolymer or copolymer is dissolved in a solvent mixture that can only solubilize the homopolymer or copolymer at elevated temperatures. The solvent mixture contains a good solvent for the polymer mixed with at least one additive that decreases the solvating power of the solvent. This additive can be a non-solvent for the polymer. The homogeneous polymer solution is then suspended in a hot inert dispersing liquid. The two phase liquid mixture is subjected to stirring to produce droplets of the polymer solution. The droplets are introduced to a cool inert liquid with stirring. The droplets are then collected and the polymer solvent is extracted to produce the porous beads of this invention. The beads are isotropic with pores ranging from 0.002–5 microns in diameter. No cells connecting the pores are seen as described in much of the prior art. The cell diameter to pore diameter ratio C/P would be accordingly, 1.0, distinguishing them from the preferred embodiments of the above-identified Castro patents. The uniform microporosity is believed to be due to selecting a proper solvent/ non-solvent composition. The addition of the non-solvent increases the rate of the phase separation. Use of less than 10 percent by weight of polymer in the solution is preferred to provide a pore volume of greater than 90 percent. The facts that the beads are substantially skinless, that they do not stick together and that they possess good handling strength even at high pore volumes are entirely unexpected.

DETAILED DESCRIPTION OF THE INVENTION

The porous beads of this invention are made from acrylonitrile homopolymers and/or copolymers. The acrylonitrile copolymers comprise polyacrylonitrile copolymerized with a ($C_2$–$C_6$) mono-olefin, a vinylaromatic, a vinylaminoaromatic vinyl halide, a ($C_1$–$C_6$)alkyl(meth)acrylate a (meth) acrylamide, a vinyl pyrrolidone, a vinylpyridine, a ($C_1$–$C_6$) hydroxyalkyl(meth)acrylate, a (meth)acrylic acid, an acrylamidomethylpropylsulfonic acid an N-hydroxy-containing ($C_1$–$C_6$)alkyl (meth)acrylamide, or a mixture of any of the foregoing.

As solvents for acrylonitrile homopolymers or copolymers, any organic or inorganic liquid capable of dissolving them without permanent chemical transformation can be used. These include dimethyl sulfoxide, dimethyl formamide dimethyl sulfone, aqueous solutions of zinc chloride and sodium thiocyanate.

Non-solvents for acrylonitrile homopolymers or copolymers may comprise any liquid medium which is immiscible therewith. These may comprise urea, water, glycerine, propylene glycol, ethylene glycol or mixtures thereof.

Non-solvent dispersants can comprise any liquid medium which is immiscible with the acrylonitrile homopolymers or copolymers and the polymer solvent. Usually, they will comprise liquids of low polarity, such as aliphatic, aromatic or hydroaromatic hydrocarbons and their halogenated derivatives, low molecular weight polysiloxanes, olefins, ethers and similar such compounds.

Preferred solvent-nonsolvent systems comprise a solvent mixture of dimethyl sulfone-urea-water or dimethyl sulfoxide or dimethyl sulfone with either water, ethylene glycol, or propylene glycol added and the hot inert liquids of choice are lower aliphatic, aromatic, hydroaromatic hydrocarbons such as mineral oil, low odor petroleum solvents, or kerosene. As extraction solvents, preferred are lower alkanols, such as methanol or ethanol or lower ketones, such as acetone, and water.

The morphology of the present invention is also very difficult to obtain by conventional solvent phase separation techniques. In those cases, the solvent diffusion either causes asymmetric morphologies to be formed or much smaller pores. See U.S. Pat. No. 4,486,549, Example 1, wherein porous polyacrylonitrile particles formed from an atomizer cup and quenched in aqueous dimethyl formamide using a solvent phase inversion process, gave low pore volumes and non-spherical particles.

In a convenient way of proceeding, a poly acrylonitrile copolymer (98/2 acrylonitrile/methyl acrylate by weight) is dissolved in a hot (110–140° C.) solvent/non-solvent mixture designed so that the copolymer is soluble only at elevated temperatures (50 to 110° C.). The composition of the mixture required to meet this condition is determined by running cloud point experiments to determine the temperature where phase separation occurs. Preferably, the solvent will be either dimethylsulfoxide or dimethylsulfone and the non-solvent will be chosen from water, urea, glycerin, ethylene glycol, propylene glycol, or a combination of them. Preferably typical total solvent/non-solvent ratios will vary from 95/5 to 65/35 by weight. Typical polymer concentration will range from 0.5 to about 20 percent, preferably less than 10 percent total polymer solids in the solvent/non-solvent mixture.

The hot polymer solution is dispersed with stirring in a liquid e.g., mineral oil, which is substantially immiscible with the solution. Typically 1 volume of polymer solution is dispersed in 4 volumes of mineral oil, with rapid stirring to form droplets. Typical diameters range from 20 microns to 400 microns. The droplets are then cooled below the phase separation temperature. The polymer phase separates from the solvent/non-solvent solution and then precipitates as droplets of solid polymer and solvent. The solid droplets are then removed from the mineral oil.

The collected droplets are then extracted with a material which is miscible with the solvent/non-solvent mixture but not a solvent for PAN to produce porous beads. The extracted beads are dried to produce a micro-porous product. The pore size of the bead can be varied from 0.002 micron to 5 microns by varying the copolymer composition or the concentration and type of non-solvent. The total pore volume is determined by the original concentration of the polymer in the solvent/non-solvent solution. It is also contemplated by this invention to remove the solvent material from the solidified beads by any other convenient method such as simply washing in the case of liquid solvents.

Specific applications of this technique will be exemplified in detail hereinafter.

When used herein and in the appended claims, the term "pore volume" means milliliters of void per gram of polyacrylonitrile. Pore volume is directly a function of the polymer concentration. Beads with pore volume greater than 1.5 ml/g are especially preferred. Pore volume is measured by conventional means, such as mercury porosimetry.

The term "substantially non-swellable in water" means that in water, volume of the beads will increase through swelling by less than about 5 percent. Nonswellable beads are preferred since the bulk volume remains essentially constant in column chromatographic applications thus resulting in consistent flow rates and negligible head pressure losses. The term "skinless" is intended to define porous particles which do not exhibit a surface skin and thereby are efficient for direct absorption of high molecular weight molecules. Bulk density of the polymer beads is measured in conventional ways, e.g., by tapping to constant volume. The beads of this invention will preferably have a bulk density of greater than about 5 ml/g. Lower bulk densities are not as desirable because they tend to have lower capacities. The upper limit of bulk density is about 15 ml/g. At levels above this no economic advantages are noted and mechanical strength is reduced. The average bead diameter can vary widely, depending on its use. Preferably it will be from about 5 microns to about 2 millimeters, more preferably from about 5 microns to about 150 microns. Special mention is made of bead diameters of about 5 microns; these are uniquely suitable for analytical high pressure liquid chromatography. For other chromatography uses, in general, bead sizes of from about 5 to about 150 microns are preferred, especially from 5 to 20 microns, and especially preferably from 20 to 100 microns. Bead sizes can be measured in conventional ways, for example, by use of a particle size analyzer. Although the pore sizes can vary widely, and are measured in conventional ways, for example by nitrogen adsorption or mercury intrusion, it is preferred that the average pore diameter be from about 0.002 to about 5 microns and, especially preferably, from about 0.1 to about 1 microns. Also preferable are beads with an average pore diameter from about 0.002 to about 0.1 microns. When the beads are used to contain a compound, it is preferred that the compound comprise a protein, an enzyme, a peptide, a nucleic acid, a polysaccharide, a dye, a pigment, or a mixture of any of the foregoing, but especially a protein. The beads may be filled with such a compound by any convenient means, for example, by physical entrapment, physical adsorption or chemical bonding depending on the compound. In any event, the porous bead used preferably will be one in which the pore diameter is at least about 3 times the diameter of the compound.

Conventional techniques are employed to utilize the adsorptive capacity of the porous beads of this invention. The beads can be used, for example, to adsorb vitamins, antibiotics, enzymes, steroids and other bioactive substances from fermentation solutions. They can be used to decolorize various sugar solutions. They can be used to decolorize saccharified wood solutions. They can be used as column packing for gas chromatography, size exclusion chromatography, affinity chromatography or ion exchange chromatography, reverse phase or hydrophobic interaction applications. They are useful to remove phenol, and to remove various surface active agents. They can adsorb a variety of perfumes. They can decolorize waste effluents in paper pulp production, they decolorize and purify a variety of chemicals, useful for protein separation.

The beads of this invention are especially useful for protein separation. Proteins especially suitable for purification using the beads of this invention are alphalactoalbumin, albumin, gamma-globulin, albumin interferon, and the like.

DESCRIPTION OF THE PREFERRED EMBODIMENTS

The following examples illustrate the present invention. The claims are not to be construed as being limited thereto.

EXAMPLE 1

Figure 2:
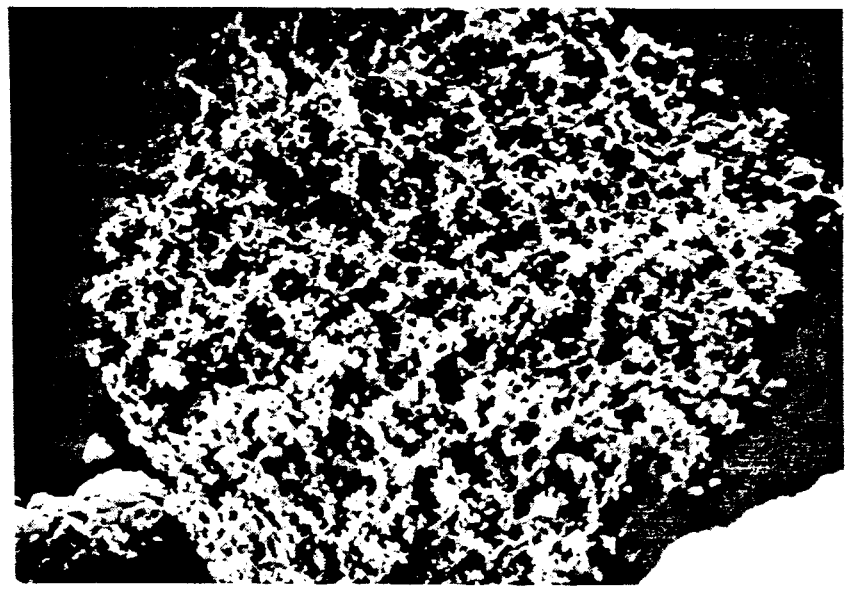
FIG. 2 is a photomicrograph at 2000X magnification of a cross section of a microporous bead of FIG. 1, illustrating high pore volume of 97 percent and uniform, non-cellular morphology.

Five grams of a wet copolymer containing 99 mole percent acrylonitrile and 1 mole percent of methyl acrylate (1:1 copolymer:water by weight) were ground with 5 grams of urea and 30 grams of dimethylsulfone to form a powdered mixture. The mixture was placed in a 1 liter flask with 100 ml of mineral oil heated to 160° C. The mixture was stirred until two liquid phases were present, one phase was a homogeneous polymer solution, the other mineral oil. Rapid stirring of the mixture with an overhead paddle stirrer gave a suspension consisting of droplets of the hot (about 120° C.) polymer solution in mineral oil. The droplets were cooled by transferring the suspension via a canula to a second stirred mixture consisting of 500 ml of mineral oil, 6 grams of dimethylsulfone, and 1 gram of urea kept at 70° C. The droplets solidified upon contacting the cooler mineral oil. The mixture was cooled with stirring to room temperature, then diluted with methylene chloride to reduce the viscosity of the oil. The droplets were collected on a Buchner funnel and washed with methylene chloride, then the solvent was extracted with 200 ml of acetone for 1.5 hours at room temperature. The resulting beads were examined by scanning electron microscopy and are seen to be highly porous, with relatively uniform pore diameters of about 0.5 microns. The pores extended through the outer surfaces of the beads. The beads ranged in size from 10 microns to a few millimeters in diameter. A SEM photograph of a cross-section of these beads appears as FIG. 2.

COMPARATIVE EXAMPLE 1A

Figure 8:
FIG. 8 is a photomicrograph at 347X magnification of a prior art polyacrylonitrile particle (Matsumoto, U.S. Pat. No. 4,486,549) showing a non-uniform disc-shaped structure.

Particles were made by the procedure taught in Example 1 of Matsumoto, U.S. Pat. No. 4,486,549. 120 Grams of polyacrylonitrile homopolymer were dissolved in 1800 ml of dimethylformamide and the resultant solution was added dropwise by an rotational atomizer cup (model PPH 306 OOD supplied by Sames Electrostatic, Inc.) at a rate of 20 ml per minute into a 20% aqueous dimethylformamide solution whereby there were obtained particles of polyacrylonitrile. An SEM photograph (FIG. 8) shows a different shape and morphology than obtained with the processes of the Examples herein.

COMPARATIVE EXAMPLES 1B-1C

Figure 5:
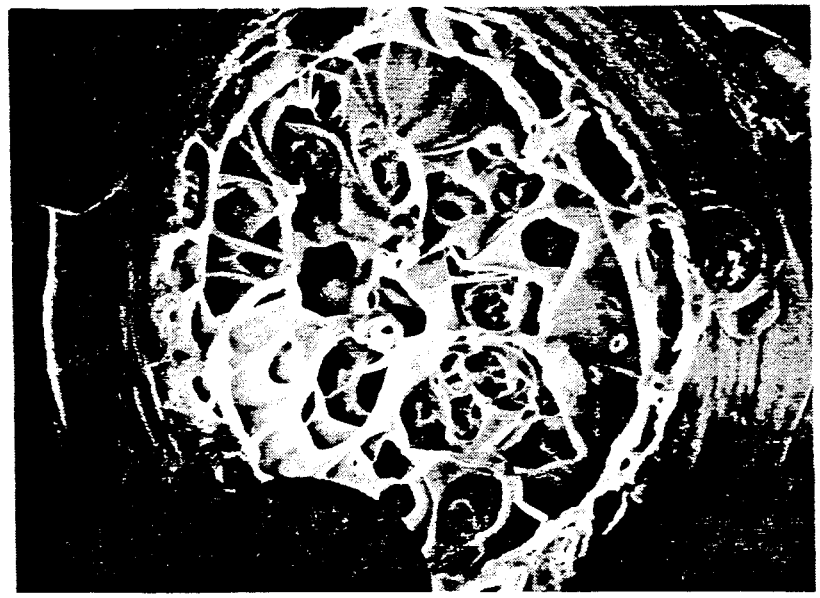
FIG. 5 is a photomicrograph at 111X magnification of a section of a prior art polyacrylonitrile particle (Stoy, U.S. Pat. No. 4,110,529, Example 1) showing a non-spherical "disc" shaped bead having a skin on the exterior surface.
Figure 6:
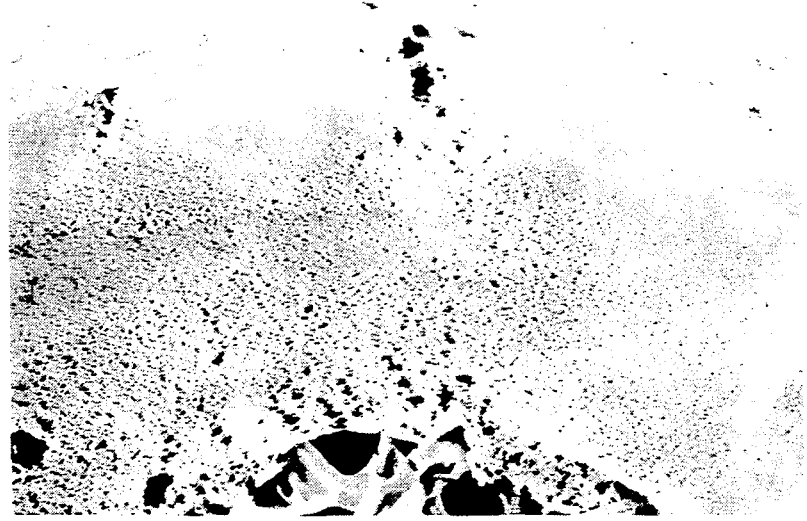
FIG. 6 is a photomicrograph at 442X magnification of a section of a prior art polyacrylonitrile particle (Stoy, U.S. Pat. No. 4,110,529, Example 2) showing a bead with extremely large interior pores of 20 to 40 microns in diameter.
Figure 7:
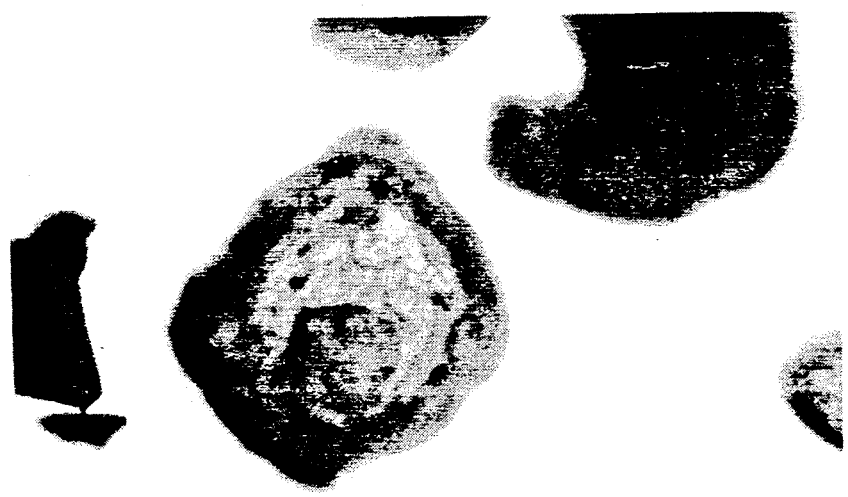
FIG. 7 is a photomicrograph at 50X magnification, of a section of a prior art polyacrylonitrile particle (Stoy, U.S. Pat. No. 4,110,529, Example 2) showing a non-uniform pore structure.

Beads were prepared following the teachings of Stoy, U.S. Pat. No. 4,110,529. Following the general procedure of Example 1 of Stoy, polyacrylonitrile was dissolved in dimethyl sulfoxide, dispersed in paraffin oil, and poured in a thin stream into water at 15° C. The procedure was then repeated following Example 2 of Stoy (pouring the emulsion into water at 60° C.). The spherical porous beads were separated and photographed with a scanning electron microscope. The photographs appears as FIGS. 5 and 6. The beads were seen to have a porous exterior and extremely large interconnected pores in the interior, unlike those of the present invention in which the beads are substantially isotropic.

EXAMPLE 2

The process of Example 1 was repeated using 9 percent of the polymer of Example 2 and 21 percent of water. A microporous bead was obtained with average pore size of 0.8 microns.

EXAMPLE 3

The process of Example 1 was generally repeated using 15 percent of the polymer of Example 2 and 15 percent of water. However, the polymer dispersion was pipetted into a flask of room temperature mineral oil.

Microporous partially skinned beads were obtained with average pore size of 0.7 microns.

EXAMPLE 4

The procedure of Example 3 was repeated using 15 percent of a polymer consisting of 95.5 mole percent acrylonitrile, 3.4 mole percent methyl methacrylate and 1.1 mole percent acrylamidomethylpropyl sulfonic acid and 15 percent water as a non-solvent; microporous partially skinned beads were obtained with average pore size of 0.2–0.3 microns.

EXAMPLE 5

The procedure of Example 3 was repeated using 15 percent of the polymer of Example 4 and 20 percent water as a non-solvent; microporous partially skinned beads were obtained with average pore size of 0.7 microns.

EXAMPLE 6

The procedure of Example 3 was repeated using 15 percent of a copolymer comprising 90 mole percent acrylonitrile and 10 mole percent methyl methacrylate units and microporous partially skinned beads were obtained with an average pore size of 3.5–6.5 microns.

COMPARATIVE EXAMPLE 1D

The procedure of Example 3 was repeated using 15 percent of a copolymer comprising 50 mole percent acrylonitrile and 50 mole percent methyl methacrylate units and 15 percent water as a non-solvent. Microporous beads were obtained with average pore size of about 10 microns.

EXAMPLE 7

The procedure of Example 1 was repeated using 3 percent of a 99 mole percent acrylonitrile - 1 percent methyl acrylate copolymer, and 11 percent water as a non-solvent. Skinless microporous polymer beads in accordance with this invention were obtained, as illustrated in FIG. 1.

EXAMPLE 8

Figure 3:
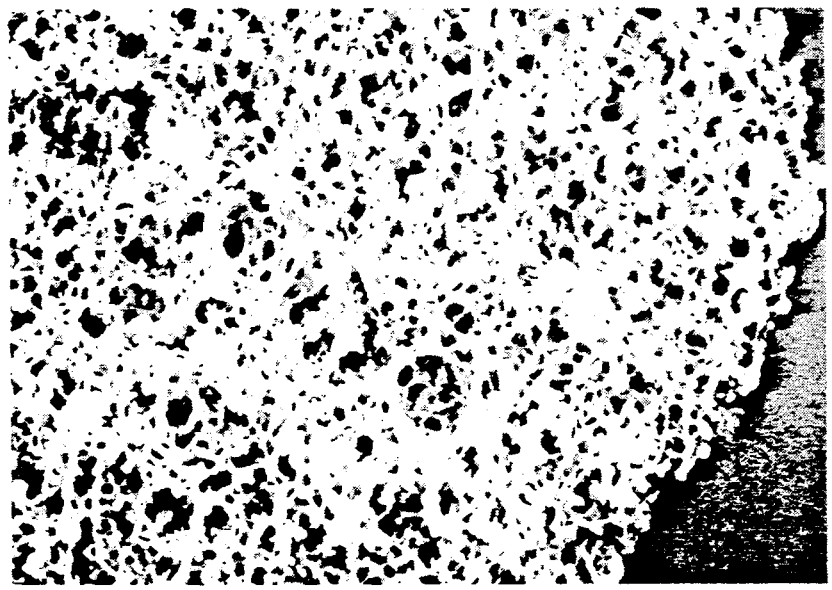
FIG. 3 is a photomicrograph at 1,440X magnification of a section of a poly(acrylonitrile) copolymer bead in accordance with this invention, illustrating a uniform diameter non-cellular pore morphology, a pore volume of 97 percent and substantial matrix uniformity.
Figure 4:
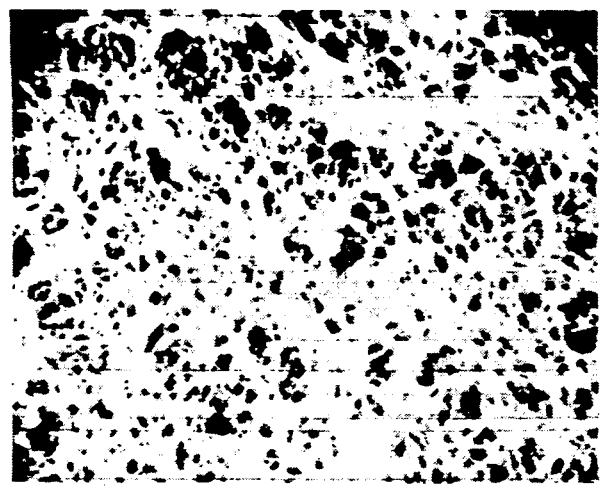
FIG. 4 is a photomicrograph at 2000X magnification of a section of a prior art polypropylene foam, (Castro, U.S. Pat. No. 4,519,909, FIG. 67) showing a 75 pore volume, microporous non-cellular structure. The structure is not a bead.

The procedure of Example 1 was repeated substituting 3 percent of a 99 mole percent acrylonitrile 1 mole percent methyl acrylate copolymer and 4 percent of water and 13 percent of urea. Microporous beads in accordance with this invention were obtained, a typical cross-section of the beads being illustrated at 1,440X magnification in FIG. 3.

EXAMPLE 9

The thermal phase separation technique of Example 1 was repeated with polyacrylonitrile copolymers containing from 50 to 98 mole percent of acrylonitrile and using dimethyl sulfoxide, dimethyl sulfone, water, urea, glycerine, ethylene glycol, and propylene glycol as solvent mixture components to produce microporous beads in accordance with this invention.

EXAMPLE 10

The microporous beads of Example 1 (FIGS. 1 and 2) are packed into chromatographic column. A buffered aqueous solution of albumin is passed through the column. Protein is adsorbed in the microporous beads. There is then passed through the column a desorbent comprising a buffered aqueous salt solution. A large part of the protein is recovered in a purified, undenatured state.

EXAMPLES 11–12

The procedure of Example 10 is repeated, substituting buffered aqueous solutions of alpha-lactoalbumin and gamma-globulin for the albumin. The beads take up the respective proteins from solution, and they can be displaced in an undenatured state by desorption with buffered aqueous solutions having a higher salt concentration.

The above-mentioned patents and publications are incorporated herein by reference.

Many variations will suggest themselves to those skilled in this art in light of the above, detailed description. For example, glucose and sucrose solutions can be decolorized by contact with the microporous beads of this invention; fatty acids such as butanoic acid, propionic acid and acetic acid can be adsorbed from aqueous solutions with them. Soaps and detergents can be adsorbed from solutions using them. Enzymes can be adsorbed in them and then used to catalyze reactions in substrates such as fermentation broths passed through the beads containing such bound enzymes. All such obvious variations are within the full intended scope of the appended claims.

We claim:

1. A substantially skinless highly porous bead comprising a homopolymer or copolymer of an acrylonitrile, said bead being substantially non-swellable in water, being substantially isotropic, having pores of not substantially greater than about 5 microns in diameter and a pore volume not substantially less than about 1.5 ml/g.

2. A porous bead as defined in claim 1 which is substantially spherical.

3. A porous bead as described in claim 1 wherein said copolymer comprises from about 45 to about 99.5 mole percent of acrylonitrile.

4. A porous bead as defined in claim 1 wherein the pores are substantially isotropic throughout the bead.

5. A porous bead as defined in claim 1 wherein the pore volume is less than about 5 ml/g.

6. A porous bead as defined in claim 1 wherein the average bead diameter is from about 5 microns to about 2 millimeters.

7. A porous bead as defined in claim 5 wherein the average bead diameter is from about 5 to about 150 microns.

8. A porous bead as defined in claim 6 wherein the average bead diameter is from about 5 to about 20 microns.

9. A porous bead as defined in claim 6 wherein the average bead diameter is from about 20 to about 150 microns.

10. A porous bead as defined in claim 1 wherein the average pore diameter is from about 0.002 microns to about 5 microns.

11. A porous bead as defined in claim 1 wherein the average pore diameter is from about 0.002 microns to about 0.1 microns.

12. A porous bead as defined in claim 9 wherein the average pore diameter is from about 0.1 micron to about 1 micron.

13. A porous bead as defined in claim 1 wherein said polyacrylonitrile copolymer comprises an acrylonitrile copolymerized with a ($C_2$–$C_6$) monoolefin, a vinylaromatic, a vinylaminoaromatic, a vinyl halide, a ($C_1$–$C_6$)

alkyl (meth)acrylate, a (meth)acrylamide, a vinyl pyrrolidone, a vinyl pyridine, a ($C_1$-$C_6$)hydroxyalkyl (meth)acrylate, a (meth)acrylic acid, an acrylamidomethylpropylsulfonic acid, an N-hydroxy-containing ($C_1$-$C_6$) alkyl(meth)acrylamide, or a mixture of any of the foregoing.

14. A porous bead as defined in claim 1 said pores being at least partially filled with a compound.

15. A porous bead as defined in claim 14 wherein said compound is selected from a protein, an enzyme, a peptide, a polysaccharide, a nucleic acid, a dye, a pigment or a mixture of any of the foregoing.

16. A porous bead as defined in claim 15 wherein said compound comprises a protein.

17. A porous bead as defined in claim 15 wherein the pore diameter is at least about 3 times the diameter of said compound.

18. A process for the preparation of isotropic porous polymer beads, said process comprising
 (i) heating and mixing an acrylonitrile homopolymer or copolymer with a mixture comprising a solvent and a non-solvent for the polymer to form a homogeneous solution:
 (ii) breaking the homogeneous solution into droplets;
 (iii) cooling the droplets, optionally in the presence of an inert liquid, to bring about phase separation and solidification of the polymer in the droplets;
 (iv) separating the droplets from any inert liquid and the solvent-non-solvent mixture to produce isotropic porous beads.

19. A process as defined in claim 18 wherein said solvent comprises dimethyl sulfone, the non-solvent comprises urea, water, propylene glycol, ethylene glycol or a mixture thereof and step (i) is carried out at a temperature of at least about 130° C.

20. A process as defined in claim 18 wherein the inert liquid comprises mineral oil, heptane or a mixture thereof.

21. A process as defined in claim 19 wherein the beads are extracted with a non-solvent for the polymer, said non-solvent comprising acetone, methanol water or a mixture of any of the foregoing.

22. A process as defined in claim 18 wherein said homogeneous solution contains less than about 10 weight percent homopolymer or copolymer.

23. A process as defined in claim 18 wherein said isotropic porous polymer beads are substantially skinless.

24. The process as defined in claim 18 wherein said homogeneous mixture in step (i) contains less than about 10 weight percent total homopolymer or copolymer solids and the isotropic porous polymer beads are substantially skinless.

25. The product of the process of claim 18.

26. The product of the process of claim 22.

27. The product of the process of claim 24.

* * * * *